No. 649,613. Patented May 15, 1900.
W. McNEILL.
FILLER FOR LUBRICATORS.
(Application filed Apr. 22, 1899.)
(No Model.)
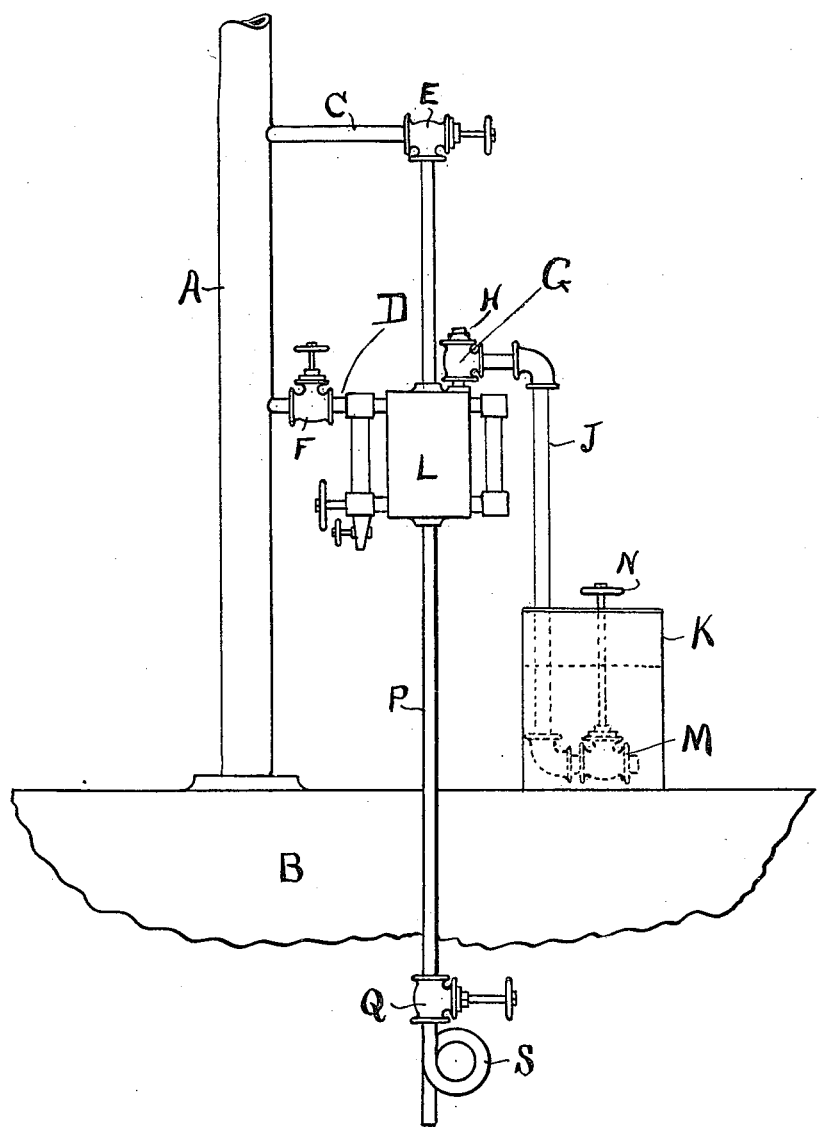
WITNESSES:
Howard G. Redfield
W. H. C. Petersen
INVENTOR:
William McNeill
By Casper L. Redfield
ATTORNEY.
THE NORRIS PETERS CO., PHOTO-LITHO., WASHINGTON, D. C.

UNITED STATES PATENT OFFICE.

WILLIAM McNEILL, OF CHICAGO, ILLINOIS, ASSIGNOR TO THOMAS W. McNEILL, OF SAME PLACE.

FILLER FOR LUBRICATORS.

SPECIFICATION forming part of Letters Patent No. 649,613, dated May 15, 1900.

Application filed April 22, 1899. Serial No. 714,021. (No model.)

*To all whom it may concern:*

Be it known that I, WILLIAM MCNEILL, a citizen of the United States of America, and a resident of Chicago, county of Cook, State of Illinois, have invented certain new and useful Improvements in Fillers for Lubricators, of which the following is a specification.

My invention relates to fillers for the type of lubricators ordinarily applied to the steam-pipe of an engine for the purpose of supplying the cylinder with oil, and has for its object a device by which such lubricators may be quickly and easily filled.

My invention is illustrated in the accompanying drawing, in which—

A represents a steam-pipe connected to a steam-cylinder B in the ordinary manner. A lubricator L is connected to the steam-pipe A by means of the pipes C and D, in which are the valves E and F. The ordinary filling-plug is replaced by a fitting G, the top of which is closed by a plug H and to the side of which is connected a pipe J, extending downward to near the bottom of an oil-reservoir K. The lower end of the pipe J is closed by a valve M, the handle N of which is on the exterior of the reservoir K in easy reach. The reservoir K is an ordinary open-top reservoir, which is kept filled with sufficient oil to always submerge the valve M. The reservoir K might be placed above the lubricator L and the oil be permitted to flow directly from one to the other, but to do so would be to make it inconvenient to reach for filling, for inspection, and for opening the valve M. I therefore prefer to place the reservoir K at some convenient place on the engine-cylinder B below the lubricator L and provide means for raising the oil from the reservoir to the lubricator. I have another reason for the placing of the reservoir K, and that is that the kind of oil usually used for cylinder lubrication is a heavy oil that does not flow freely unless it is comparatively warm. I therefore place reservoir K on the cylinder B so that it may be kept hot by direct contact with a source of heat. To enable me to raise the oil from the open reservoir K to the lubricator L, I replace the drip connection to the lubricator by a pipe P, which extends below the bottom of the reservoir K. Near the lower end of the pipe P is a valve Q, and below this the pipe is bent into a coil S.

When first set up, all the valves are closed and the lubricator filled by removing the plug H, after which the said plug is returned to place. The filling of the lubricator L also fills the pipes J and P to the valves M and Q. The valves E and F are then opened, when the lubricator operates in the ordinary manner. As is well known, this form of lubricator operates by a very gradual displacing of oil in the lubricator by condensation from the pipe C, which oil finds its way to the cylinder B by way of the pipes D and A. When the supply of oil in the lubricator L is practically exhausted, the valves E and F are closed and the valves M and Q are opened. This makes the pipe J, fitting G, lubricator L, and pipe P a siphon whose ends are represented by the valves M and Q. From the upper part of L to M this siphon is filled with oil and from the same point to Q it is filled with water. Consequently the opening of the valve Q sets this siphon into operation, drawing the water off through the drip or waste pipe P and supplying the place of the water by oil raised from K through pipe J. When a sufficient body of oil has thus been supplied to the lubricator, the valves Q and M are closed and the valves E and F are opened, when the operation is repeated. It will be apparent that in filling a lubricator by this method it is essential that a sufficient body of oil be maintained in the reservoir K to always keep the valve M submerged. Otherwise the suction would be broken and the operation fail. It is also important that in opening the valve Q no air be permitted to ascend the pipe P to the lubricator. I accomplish this purpose by bending the pipe P below the valve Q into the coil S, which thereby makes a trap in which there is always a body of water past which no air can flow up pipe P. When the device is first set up, the trap S may be sealed by permitting a little oil to flow into it; but afterward the sealing will be by water unless the siphon be permitted to run long enough to discharge oil from the lubricator. It will be obvious that I might seal the discharge end of the pipe P by submerging it or by the use of some other form of trap; but I prefer to use the coil S, because it is both simple and efficient.

What I claim is—

1. In combination with a lubricator, a reservoir adapted to contain oil, a siphon having its shorter leg immersed in oil in said reservoir and having said lubricator included in its longer leg, and means for controlling the operation of said siphon so as to cause oil from said reservoir to replace water in said lubricator.

2. The combination with a lubricator adapted to feed oil to a steam-pipe and an open-top reservoir for oil located below said lubricator, of a pipe having one end connected to the upper portion of said lubricator and the other end immersed in oil in said reservoir, a second pipe connected to the lower end of said lubricator and extending to a point below said reservoir, and valves for opening and closing said pipes.

3. The combination with a lubricator adapted to feed oil to a steam-pipe, of an open reservoir located below and adjacent to said lubricator, a siphon adapted to draw oil from said reservoir and having said lubricator included within its longer leg, and valves for controlling the operation of said siphon.

4. The combination with a steam-pipe, a closed lubricator and an open reservoir located below said lubricator, of means for displacing oil in said lubricator by condensation from said steam-pipe, and a siphon for replacing water in said lubricator by oil from said reservoir, said displacing and replacing actions serving to alternately feed a lubricator full of oil to said steam-pipe and to refill said lubricator from said reservoir.

Signed by me at Chicago, Illinois, this 19th day of April, 1899.

WILLIAM McNEILL.

Witnesses:
C. L. REDFIELD,
HOWARD A. REDFIELD.